F. RAUSCHER.
COMBINED LAMP AND SIGNAL.
APPLICATION FILED JUNE 9, 1919.
1,351,689.
Patented Aug. 31, 1920.
2 SHEETS—SHEET 1.
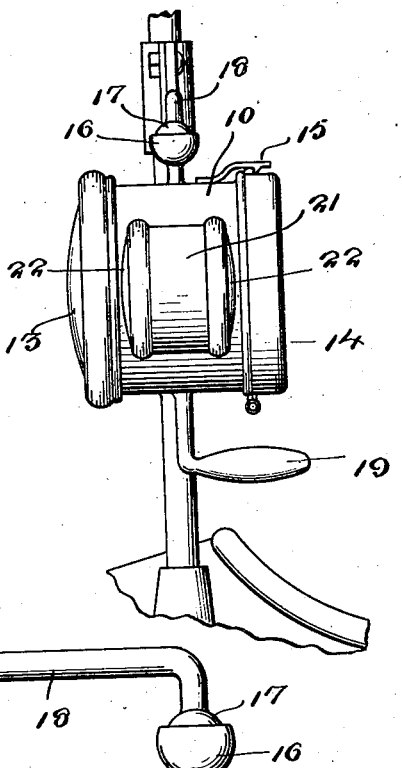
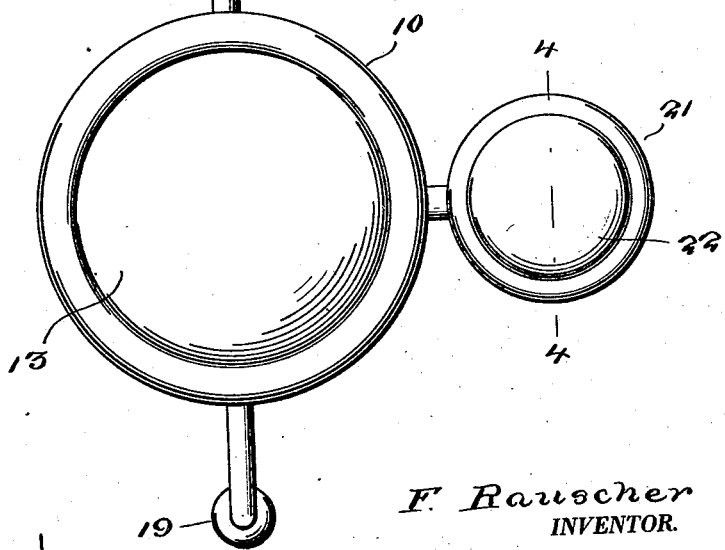
F. Rauscher
INVENTOR.
WITNESS:
BY
ATTORNEY.

F. RAUSCHER.
COMBINED LAMP AND SIGNAL.
APPLICATION FILED JUNE 9, 1919.
1,351,689.
Patented Aug. 31, 1920.
2 SHEETS—SHEET 2.
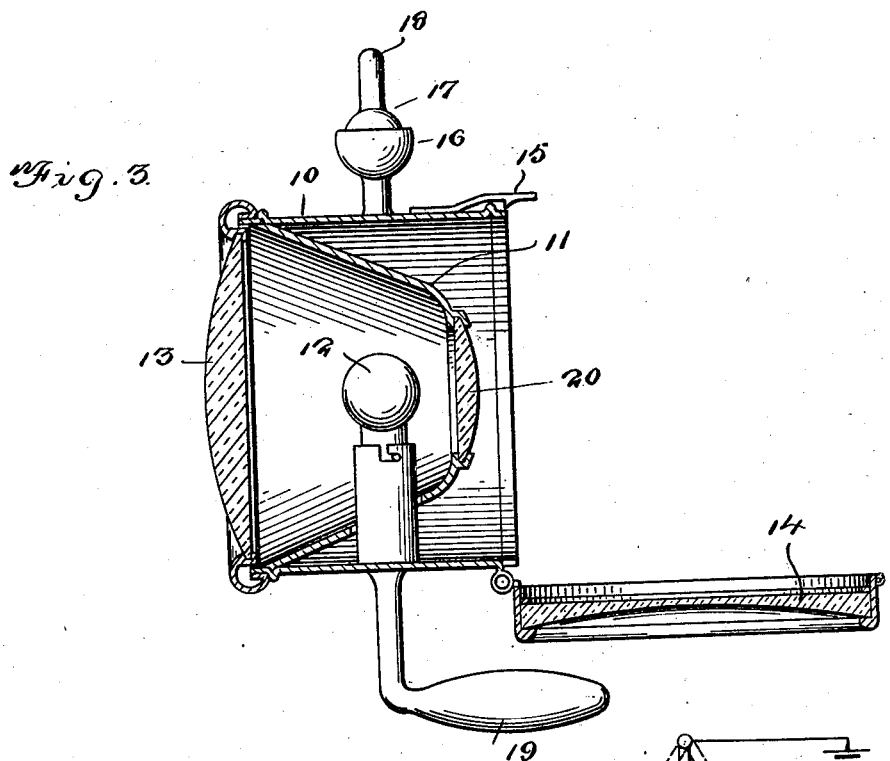
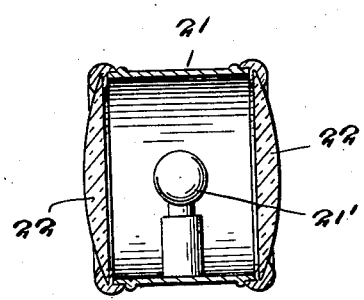
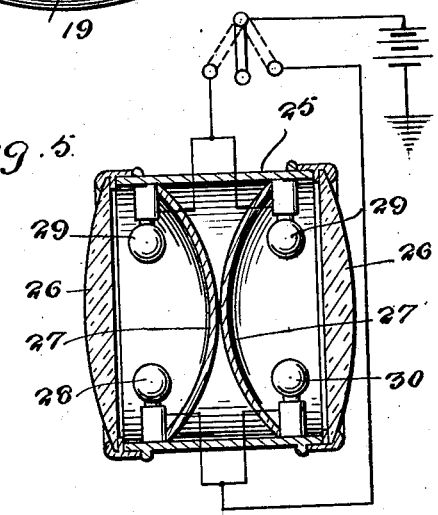
F. Rauscher
INVENTOR.
WITNESS:
E. R. Ruppert
BY
Victor J. Evans
ATTORNEY.

UNITED STATES PATENT OFFICE.

FREDERICK RAUSCHER, OF NEW YORK, N. Y.

COMBINED LAMP AND SIGNAL.

1,351,689.	Specification of Letters Patent.	Patented Aug. 31, 1920.

Application filed June 9, 1919. Serial No. 302,682.

*To all whom it may concern:*

Be it known that I, FREDERICK RAUSCHER, a citizen of the United States, residing at New York city, in the county of New York and State of New York, have invented new and useful Improvements in Combined Lamps and Signals, of which the following is a specification.

This invention comprehends the provision of a lamp adapted to be arranged at one side of the wind shield of a motor vehicle, and designed to be used in the capacity of a running light, spot light, signal, rear view mirror, and park light.

The nature and advantages of the invention will be better understood when the following detail description is taken in connection with the accompanying drawings, the invention residing in the construction, combination and arrangement of parts as claimed.

In the drawings forming part of this specification, like numerals of reference indicate similar parts in the several views and wherein:—

Figure 1 is a fragmentary view of an automobile showing the device mounted in position thereon.

Fig. 2 is a front elevation of the device.

Fig. 3 is a vertical section taken through Fig. 1 showing the mirror lowered, and the device used as a park light.

Fig. 4 is a transverse sectional view taken on the line 4—4 of Fig. 2.

Fig. 5 is an enlarged sectional view through a modified form of the invention.

The device forming the subject matter of my invention, embodies a lamp casing 10 which may be constructed from any suitable material, size and configuration and in which is arranged a reflector 11 and an electric light bulb 12. The front of the casing is closed by a suitable lens 13 while pivotally mounted on the back of the casing is a mirror 14, the latter being held fixed relatively to the casing by means of a suitable latch 15. The mirror 14 of course permits the driver of the machine to view traffic in the rear or to one side of the machine. Projecting from the casing 10 is a resilient socket 16 which receives the spherical or ball like extremity 17 of a bracket arm 18, projecting from one side of the wind shield of the machine. Depending from the bottom of the casing 10 is a handle 19 the extremity of which is bent at right angles to the casing rearwardly in convenient reach of the operator. This handle provides means whereby the operator can swing the lamp from its ball and socket connection to various positions, thus permitting the lamp to be used in the capacity of a spot light when desired. The back of the reflector 11 is formed with an opening for the reception of a small lens 20 which is arranged immediately behind the bulb 12. The mirror 14 is hinged at its bottom, when released from the latch 15 to be lowered to project below the casing 10. With the mirror in this position, the lens 20 is exposed to view, and as the lens is red, a red light is displayed from the rear of the lamp, thus permitting its use in the capacity of a parking light.

Secured to and arranged at one side of the casing 10, is a comparatively small lamp casing 21 which is provided with a lens at the front and rear as at 22. An electric light bulb, blue in color is arranged within the casing 21 and is adapted to be lighted from a switch on the steering wheel of the vehicle. This construction provides a signal which is susceptible of use in either the day or night time. Obviously, when the blue bulb 21 is lighted, the drivers of other machines as well as the pedestrians will be aware of the fact that the operator intends to stop, or to turn his machine in one or the other directions from a straight course. Consequently they will use a certain amount of discretion and precaution to avoid accidents.

In Fig. 5, I have shown a modified construction of the signal light casing wherein the casing 25 is provided with a lens 26 at the front and rear. The casing 25 is divided into separate compartments by a pair of oppositely curved reflectors 27, and in each compartment there is arranged two electric light bulbs of varying colors. The two uppermost bulbs in the respective compartments, are blue, while the lowermost bulb in the front compartment is white, indicated at 28, while the corresponding bulb in the other compartments is red, as at 30. The two blue bulbs 29 are connected in circuits to be lighted simultaneously, while the white light 28 and the red light 30 are connected in another circuit to be simultaneously lighted independently of the blue light 29. These bulbs are lighted from a switch arranged upon the steering wheel of the motor vehicle. When this form of the invention is used, it is of course understood that the red lens 20 described in connection with the preferred form of the invention, is eliminated, and that the mirror 14 need not be pivoted or hinged to the casing 10. In practice, the lamp 10 serves as the running light. When it is desired to give a signal to indicate the intentions of the operator to stop or turn his machine off a straight course, the blue bulbs 29 are lighted by means of the switch on the steering wheel of the vehicle. When the machine is parked, the light in the lamp 10, and the signal light usually at the rear of the machine are extinguished. The white light 28 and the red light 30 are then illuminated, the white bulb 28 providing the necessary light for the front of the machine, while the red light 30 serves as a parking light. It is to be understood that both of these bulbs are much smaller than the bulbs employed in the casing 10 and the signal light at the rear of the machine, and that the life of the battery is materially prolonged by the use of my invention.

I desire to have it understood that I do not limit myself to the exact construction and arrangement of parts herein disclosed, and that such changes may be resorted to when desired as fall within the scope of what is claimed.

Having thus described my invention what I claim is:—

1. The combination with an automobile lamp, including a casing, of a signal comprising a relatively small casing carried by and arranged at one side of the lamp casing, a lens at each end of said small casing, reflectors disposed within said casing and dividing the latter into separate compartments, a plurality of bulbs arranged in each compartment and varying in color, and certain lights of the respective compartments being in circuit and adapted to be lighted simultaneously and independently of the remaining bulbs.

2. An automobile lamp comprising a casing, means for supporting said casing from the wind shield, for universal movement, a reflector within the casing having an opening in the rear thereof, an electric light bulb arranged within the reflector, a red lens within said opening of the reflector, a mirror hingedly mounted upon the back of said casing and adapted to be lowered to expose said red lens, and means for holding said mirror fixed relatively to the casing in a position to cover said lens.

In testimony whereof I affix my signature.

FREDERICK RAUSCHER.